(12) United States Patent
Kwon et al.

(10) Patent No.: US 11,417,909 B2
(45) Date of Patent: Aug. 16, 2022

(54) SECONDARY BATTERY SOLID ELECTROLYTE COMPOSITION AND SOLID ELECTROLYTE PREPARED THEREFROM

(71) Applicant: LG CHEM, LTD., Seoul (KR)

(72) Inventors: Sujee Kwon, Daejeon (KR); Jeongae Yoon, Daejeon (KR); Sung Soo Yoon, Daejeon (KR); Kyung Oh Kim, Daejeon (KR); Jonghyun Chae, Daejeon (KR); Yeonju Lee, Daejeon (KR); Daeil Kim, Daejeon (KR); Lucia Kim, Daejeon (KR); Jongheon Kwak, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 295 days.

(21) Appl. No.: 16/646,982

(22) PCT Filed: Jul. 20, 2018

(86) PCT No.: PCT/KR2018/008244
§ 371 (c)(1),
(2) Date: Mar. 12, 2020

(87) PCT Pub. No.: WO2019/054622
PCT Pub. Date: Mar. 21, 2019

(65) Prior Publication Data
US 2020/0212484 A1 Jul. 2, 2020

(30) Foreign Application Priority Data

Sep. 14, 2017 (KR) .................. 10-2017-0118035
Jul. 10, 2018 (KR) .................. 10-2018-0080139

(51) Int. Cl.
*H01M 10/0565* (2010.01)
*H01M 10/0525* (2010.01)
*H01M 10/0562* (2010.01)
*H01M 10/0563* (2010.01)

(52) U.S. Cl.
CPC ... *H01M 10/0565* (2013.01); *H01M 10/0525* (2013.01); *H01M 10/0562* (2013.01); *H01M 10/0563* (2013.01)

(58) Field of Classification Search
CPC ......... H01M 10/0525; H01M 10/0562; H01M 10/0563; H01M 10/0565
USPC ....................................................... 429/309
See application file for complete search history.

(56) References Cited

U.S. PATENT DOCUMENTS

| | | |
|---|---|---|
| 5,900,183 A | 5/1999 | Kronfli et al. |
| 6,159,638 A | 12/2000 | Takatera et al. |
| 2001/0033974 A1 | 10/2001 | Gavelin et al. |
| 2004/0131945 A1 | 7/2004 | Zushi et al. |
| 2005/0170255 A1 | 8/2005 | Koh et al. |
| 2005/0233221 A1 | 10/2005 | Araki et al. |
| 2008/0166636 A1* | 7/2008 | Niitani ............. C08F 293/005 525/219 |
| 2020/0235283 A1* | 7/2020 | Domingues Dos Santos ............. H01L 41/317 |

FOREIGN PATENT DOCUMENTS

| | | | |
|---|---|---|---|
| CN | 101792510 A | 8/2010 | |
| JP | 11-35765 A | 2/1999 | |
| JP | 2002-100405 A | 4/2002 | |
| JP | 2002-270237 A | 9/2002 | |
| JP | 2003-77539 A | 3/2003 | |
| JP | 2003-203676 A | 7/2003 | |
| JP | 2004-241184 A | 8/2004 | |
| JP | 2006-221873 A | 8/2006 | |
| KR | 10-0421762 B1 | 6/2004 | |
| KR | 10-2005-0092722 A | 9/2005 | |
| KR | 10-0796989 B1 | 1/2008 | |
| KR | 10-0796990 B1 | 1/2008 | |
| KR | 20160079574 A * | 7/2016 | ........... C08G 77/442 |
| WO | WO 2011/058016 A1 | 5/2011 | |

OTHER PUBLICATIONS

Extended European Search Report for European Application No. 18856085.8, dated Oct. 13, 2020.

(Continued)

*Primary Examiner* — James M Erwin
(74) *Attorney, Agent, or Firm* — Birch, Stewart, Kolasch & Birch, LLP

(57) ABSTRACT

A solid electrolyte composition for a lithium secondary battery including a fluorine-based polymer having grafted thereon a unit comprising alkylene oxide group and a crosslinkable functional group. The polymer may be formed by a process including grafting a monomer on a fluorine-based polymer, where the monomer includes alkylene oxide group and a crosslinkable functional group. Also disclosed is a solid electrolyte for a secondary battery formed by thermally curing the composition. By graft copolymerizing a monomer including alkylene oxide group and a crosslinkable functional group on a fluorine-based polymer having high lithium ion conductivity, the solid electrolyte is capable of providing a solid electrolyte for a secondary battery having significantly enhanced solid electrolyte ion conductivity and electrochemical stability.

15 Claims, No Drawings

(56) References Cited

OTHER PUBLICATIONS

Gavelin et al., "Amphiphilic polymer gel electrolytes. 3. Influence of the ionophobic-ionophilic balance on the ion conductive properties", Electrochimica Acta 46 (2001) pp. 1439-1446.
Gavelin et al., "Amphiphilic solid polymer electrolytes", Solid State Ionics 147 (2002), pp. 325-332.
International Search Report for PCT/KR2018/008244 (PCT/ISA/210) dated Oct. 30, 2018.

* cited by examiner

SECONDARY BATTERY SOLID ELECTROLYTE COMPOSITION AND SOLID ELECTROLYTE PREPARED THEREFROM

TECHNICAL FIELD

This application claims priority to and the benefits of Korean Patent Application No. 10-2017-0118035, filed with the Korean Intellectual Property Office on Sep. 14, 2017, and Korean Patent Application No. 10-2018-0080139, filed with the Korean Intellectual Property Office on Jul. 10, 2018, the entire contents of which are incorporated herein by reference.

The present invention relates to a solid electrolyte composition for a secondary battery and a solid electrolyte prepared from the same.

BACKGROUND ART

High energy density lithium secondary batteries currently mostly used in laptop computers and smart phones include a positive electrode formed with a lithium oxide, a carbon-based negative electrode, a separator, and a liquid-state or solid-state electrolyte. However, a lithium secondary battery including a liquid-state electrolyte has a stability problem such as leakage or explosion, and has a disadvantage of battery design becoming complicated to prevent this problem.

In order to resolve such a problem of a liquid electrolyte, studies on polymer electrolytes have been actively ongoing. Polymer electrolytes are largely divided into a gel-type and a solid-type. A gel-type polymer electrolyte is an electrolyte exhibiting conductivity by impregnating a liquid electrolyte having a high boiling point into a polymer film and fixing this with a lithium salt, and has similar ion conductivity with a pure liquid electrolyte due to containing a liquid electrolyte in large quantities, however, electrochemical stability problem still remains.

Meanwhile, a solid polymer electrolyte does not include a liquid electrolyte, and has an advantage in that chemical stability and electrochemical stability are high while improving a stability problem relating to leakage. However, ion conductivity at room temperature is lower compared to a liquid electrolyte by approximately 100 times, and extensive studies have been progressed to improve this problem.

A most common material currently used in a solid polymer electrolyte is polyethylene oxide (PEO), which has an ability of conducting lithium ions despite being in a solid-state. However, a linear PEO polymer electrolyte has limited chain fluidity due to high crystallinity, and has very low conductivity at room temperature since it is not able to dissociate large amounts of lithium ions due to low dielectric constant (5.0), which makes it difficult to be used in a lithium secondary battery.

In view of the above, a method of increasing flexibility of a polymer main chain by blending a polymer with no crystallinity or adding a plasticizer to polyethylene oxide, a method of lowering crystallinity by binding a low molecular polyethylene oxide side chain to an amorphous polymer main chain, a method of enhancing conductivity by lowering crystallinity that polyethylene oxide has through immobilizing polyethylene oxide having a low molecular weight to a polymer having a crosslinked structure, or the like, has been studied, however, there are still limits.

PRIOR ART DOCUMENTS

Patent Documents (Patent Document 1) Korean Patent No. 10-0796989 (2008 Jan. 16), "Proton Conductive Crosslinked-Type Fluoro-Copolymer Electrolyte Membrane"

(Patent Document 2) Korean Patent No. 10-0796990 (2008 Jan. 16), "Branched Fluoro-Copolymer Electrolyte Membranes Grafted with Hydrophilic and Sulfonating Groups"

DISCLOSURE

Technical Problem

As a result of extensive studies in view of the above, the inventors of the present invention have identified that, when preparing a solid electrolyte for a lithium secondary battery by graft copolymerizing a monomer comprising alkylene oxide group having ion conductivity and a crosslinkable functional group on a fluorine-based polymer having a high dielectric constant, ion conductivity and electrochemical stability of the electrolyte are enhanced, and have completed the present invention.

Accordingly, an aspect of the present invention provides a solid electrolyte composition for a secondary battery comprising a polymer in which a monomer comprising alkylene oxide group and a crosslinkable functional group is grafted on a fluorine-based polymer.

Another aspect of the present invention provides a solid electrolyte for a secondary battery formed by thermally curing the composition.

Technical Solution

According to an aspect of the present invention, there is provided a solid electrolyte composition for a secondary battery comprising a fluorine-based polymer having grafted thereon a unit comprising alkylene oxide group and a crosslinkable functional group. Such a polymer may be formed by a process comprising grafting a monomer on a fluorine-based polymer, wherein the monomer comprises alkylene oxide group and a crosslinkable functional group.

In one embodiment of the present invention, the fluorine-based polymer may comprise a structure of the following Chemical Formula 1.

[Chemical Formula 1]

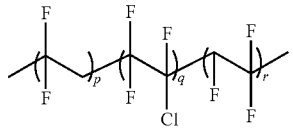

(In Chemical Formula 1, p, q and r are each independently an integer of 0≤p≤20,000, 1≤q≤22,000 and 0≤r≤15,000.)

In one embodiment of the present invention, the grafted polymer may comprise a structure of the following Chemical Formula 2.

[Chemical Formula 2]

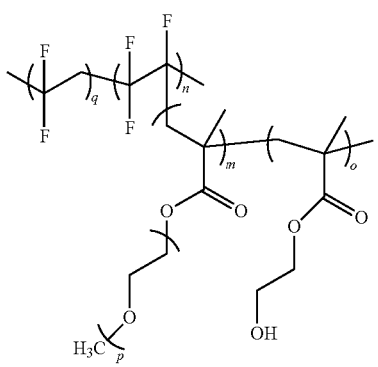

(In Chemical Formula 2, q, n, p, m and o are each independently an integer of 0≤q≤20,000, 1≤n≤22,000, 2≤p≤230, 1≤m≤200 and 2≤o≤50)

In one embodiment of the present invention, the alkylene oxide group may be ethylene oxide or propylene oxide.

In one embodiment of the present invention, the crosslinkable functional group may be one or more selected from the group consisting of a hydroxyl group, a carboxyl group and an isocyanate group.

In one embodiment of the present invention, the monomer may comprise the alkylene oxide group and the crosslinkable functional group in a molar ratio of 99.5:0.5 to 80:20.

In one embodiment of the present invention, the fluorine-based polymer may be comprised in 0.2 parts by weight to 40 parts by weight with respect to the whole 100 parts by weight of the composition.

In one embodiment of the present invention, the composition may further comprise a multifunctional crosslinking agent having two or more functional groups capable of reacting with the crosslinkable functional group.

In one embodiment of the present invention, the multifunctional crosslinking agent may be one or more selected from the group consisting of an isocyanate crosslinking agent, an epoxy crosslinking agent, an aziridine crosslinking agent and a metal chelate crosslinking agent.

In one embodiment of the present invention, the multifunctional crosslinking agent may be comprised in 0.1 parts by weight to 6 parts by weight with respect to the whole 100 parts by weight of the electrolyte composition.

According to an aspect of the present invention, there is provided a solid electrolyte for a secondary battery formed by thermally curing the solid electrolyte composition for a secondary battery.

In one embodiment of the present invention, the electrolyte may have a thickness of 50 μm to 400 μm.

In one embodiment of the present invention, the electrolyte may further comprise a lithium salt in 30 parts by weight to 70 parts by weight with respect to 100 parts by weight of the electrolyte composition.

In one embodiment of the present invention, the electrolyte may further comprise one or more types of lithium salts selected from the group consisting of LiCl, LiBr, LiI, LiClO$_4$, LiBF$_4$, LiTFSI, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, LiN(SO$_2$F)$_2$, chloroborane lithium, lower aliphatic carboxylic acid lithium, lithium tetraphenylborate and lithium imide.

In one embodiment of the present invention, the electrolyte may have ion conductivity if 1×10$^{-6}$ S/cm to 4×10$^{-5}$ S/cm.

ADVANTAGEOUS EFFECTS

By comprising a polymer prepared by grafting a monomer comprising alkylene oxide group and a crosslinkable functional group on a fluorine-based polymer having a high dielectric constant, a solid electrolyte composition for a secondary battery according to the present invention is effective in enhancing ion conductivity and electrochemical stability of an electrolyte of a lithium secondary battery.

BEST MODE

Hereinafter, the present invention will be described in more detail.

Terms or words used in the present invention and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present invention. Singular forms include plural forms as well, unless the context clearly indicates otherwise. In the present invention, terms such as "comprise" or "have" are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof.

Solid Electrolyte Composition for Secondary Battery

A fluorine-based polymer has very high lithium ion dissociation with a dielectric constant of approximately 9 to 40, and, when used in a lithium secondary battery, has an advantage of having electrochemical stability even at a high voltage (5.0 V), but has a disadvantage in that ion conductivity is very low at room temperature due to high crystallinity.

Accordingly, in order to overcome such a disadvantage of a fluorine-based polymer, the present invention provides a solid electrolyte composition for a secondary battery comprising a polymer formed by graft copolymerizing a monomer comprising alkylene oxide group and a crosslinkable functional group on a fluorine-based polymer having a high dielectric constant.

The fluorine-based polymer according to one embodiment of the present invention may be a poly(vinylidene fluoride-chlorotrifluoroethylene-trifluoroethylene) (hereinafter, P(VDF-CTFE-TrFE))-based polymer, and the fluorine-based polymer may be a compound represented by the following Chemical Formula 1.

[Chemical Formula 1]

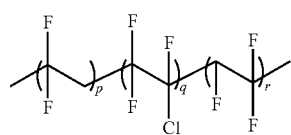

(In Chemical Formula 1, p, q and r are each independently an integer of 0≤p≤20,000, 1≤q≤22,000 and 0≤r≤15,000.)

The fluorine-based polymer according to one embodiment may be a trimer of VDF, CTFE and TrFE, and the polymer may requisitely comprise CTFE.

A monomer comprising alkylene oxide group and a crosslinkable functional group may be graft copolymerized in order to enhance ion conductivity and electrochemical stability of the fluorine-based polymer, and one embodiment of the present invention may be graft copolymerization using atomic transfer radical polymerization (hereinafter, ATRP).

The fluorine-based polymer according to the present invention is a polymer in which a branched chain may be grafted by atomic transfer radical polymerization, and any polymer may be used as long as it is such a polymeric polymer comprising a fluorine element, however, polyvinylidene fluoride, polyvinyl fluoride, polychlorotrifluoroethylene, polytetrafluoroethylene, polytriluoroethylene, poly-1,2-difluoroethylene, or a copolymer comprising one or more of these is preferably used, and preferably polychlorotrifluoroethylene and more preferably poly(vinylidene fluoride-chlorotrifluoroethylene-trifluoroethylene) (hereinafter, P(VDF-CTFE-TrFE)) may be used.

One embodiment of the present invention may reduce crystallinity of the fluorine-based polymer electrolyte by introducing alkylene oxide group having ion conductivity to a Cl group on the CTFE through atomic transfer radical polymerization, and may enhance fluidity of the polymer chain as a result. Moreover, by using a fluorine-based polymer having a high dielectric constant, more lithium ions are dissociated, and higher ion conductivity and electrochemical stability may be obtained compared to existing alkylene oxide-based polymers.

The alkylene oxide group according to one embodiment of the present invention is capable of enhancing ion conductivity of the fluorine-based polymer, and may be ethylene oxide or propylene oxide, and may preferably be ethylene oxide.

However, the polymer formed by grafting alkylene oxide group on the fluorine-based polymer is a gel-type, and therefore, a polymer 'solid' electrolyte is not obtained, and an electrochemical stability problem still exists. Therefore, by further comprising a crosslinkable functional group in the polymer, the present invention provides a solid electrolyte composition for a secondary battery resolving a disadvantage of the gel-type electrolyte.

The monomer having a crosslinkable functional group may have a site copolymerizable to the fluorine-based polymer and is capable of maintaining mechanical strength of an electrolyte by being crosslinked after thermal curing, which is described below. The monomer may be, for example, poly(ethylene glycol) methyl ether methacrylate (hereinafter, PEGMA).

The crosslinkable functional group may be any one selected from the group consisting of a hydroxyl group, a carboxyl group and an isocyanate group, and may preferably be a hydroxyl group.

The monomer according to one embodiment of the present invention may comprise the alkylene oxide group and the crosslinkable functional group in a molar ratio of 99.5:0.5 to 80:20. When the alkylene oxide group is comprised in greater than the above-mentioned range, a crosslinking reaction between the polymers is difficult causing a problem of producing a gel-type polymer electrolyte instead of a solid polymer electrolyte, and when comprised in less than the above-mentioned range, an ion transfer ability of the electrolyte may decline due to the low alkylene oxide group content, and therefore, the content is properly selected within the above-mentioned range.

The fluorine-based polymer according to one embodiment of the present invention may be comprised in 0.2 parts by weight to 40 parts by weight and preferably in 5 parts by weight to 25 parts by weight with respect to the whole 100 parts by weight of the electrolyte composition. When the fluorine-based polymer content is greater than the above-mentioned range, ion conductivity decreases due to crystallinity in the polymer although mechanical strength of the electrolyte increases. When the fluorine-based polymer content is less than the above-mentioned range, high electrochemical stability and high lithium ion dissociation properties of the fluorine-based polymer may not be obtained, and therefore, the content is properly selected within the above-mentioned range.

The solid electrolyte composition for a secondary battery according to one embodiment of the present invention may further comprise a multifunctional crosslinking agent having at least two or more functional groups capable of reacting with the polymer in which the monomer comprising alkylene oxide group and a crosslinkable functional group is grafted on the fluorine-based polymer.

The multifunctional crosslinking agent may further react with the functional group of the polymer to form a crosslinked structure between the polymers, and a solid electrolyte formed in the crosslinked structure may overcome an electrochemical stability problem of a gel-type polymer electrolyte.

Types of the multifunctional crosslinking agent are not particularly limited, and any one selected from the group consisting of an isocyanate crosslinking agent, an epoxy crosslinking agent, an aziridine crosslinking agent and a metal chelate crosslinking agent may be used.

As specific examples of the isocyanate crosslinking agent, diisocyanate compounds such as toluene diisocyanate, xylene diisocyanate, diphenylmethane diisocyanate, hexamethylene diisocyanate, isophorone diisocyanate, tetramethylxylene diisocyanate or naphthalene diisocyanate, or compounds reacting the diisocyanate compound with a polyol may be used, and as examples of the polyol, trimethylolpropane and the like may be used.

Specific examples of the epoxy crosslinking agent may comprise one or more selected from the group consisting of ethylene glycol diglycidyl ether, glycerin triglycidyl ether, trimethylolpropane triglycidyl ether, N,N,N',N'-tetraglycidyl ethylenediamine and glycerin diglycidyl ether, and specific examples of the aziridine crosslinking agent may comprise one or more selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphine oxide, however, the epoxy crosslinking agent and the aziridine crosslinking agent are not limited thereto. In addition, specific examples of the metal chelate crosslinking agent may comprise compounds in which a multivalent metal such as aluminum, iron, zinc, tin, titanium, antimony, magnesium and/or vanadium coordinates to acetylacetone, ethyl acetoacetate or the like, however, the metal chelate crosslinking agent is not limited thereto.

The multifunctional crosslinking agent may be comprised in a ratio of 0.1 parts by weight to 6 parts by weight and preferably 0.5 parts by weight to 5 parts by weight with respect to 100 parts by weight of the electrolyte composition. By adjusting the crosslinking agent content in the above-described range, properties of the electrolyte may be properly obtained at a target level.

The present invention provides a solid electrolyte for a secondary battery formed by thermally curing the solid electrolyte composition for a secondary battery described above. The solid electrolyte may exhibit effects described above.

According to one embodiment of the present specification, the electrolyte may have a thickness of 50 μm to 400 μm, and specifically 100 μm to 250 μm. When the electrolyte thickness is from 100 μm to 250 μm, electric short and crossover of an electrolyte material decrease, and excellent lithium ion conductivity properties may be obtained.

According to one embodiment of the present specification, the polymer electrolyte may have ion conductivity of $1 \times 10^{-6}$ S/cm to $4 \times 10^{-5}$ S/cm.

The solid electrolyte according to one embodiment of the present invention may further comprise a lithium salt in 30 parts by weight to 70 parts by weight and preferably in 35 parts by weight to 60 parts by weight with respect to 100 parts by weight of the electrolyte composition. When the lithium salt content is greater than the above-mentioned range, side reactions excessively occur in the electrolyte during charge and discharge of a battery, and when the content is less than the above-mentioned range, effects of improving output and cycle properties are insignificant in a lithium secondary battery, and therefore, the content is properly selected within the above-mentioned range.

The lithium salt may be used without limit as long as it is commonly used in electrolytes for a lithium secondary battery. For example, one or more types of lithium salts selected from the group consisting of LiCl, LiBr, LiI, LiClO$_4$, LiBF$_4$, LiTFSI, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, LiN(SO$_2$F)$_2$, chloroborane lithium, lower aliphatic carboxylic acid lithium, lithium tetraphenylborate and lithium imide may be further comprised, and preferably, LiTFSI may be further comprised.

Method for Preparing Solid Electrolyte Composition

A method for preparing a solid electrolyte composition according to the present invention may comprise a mixing step and a polymerizing step.

The mixing step may be a step of forming a mixture by mixing raw materials for preparing a polymer in which a monomer comprising alkylene oxide group and a crosslinkable functional group is grafted on a fluorine-based polymer, and one example of the mixing step may be a step of mixing the fluorine-based polymer with the monomer to polymerize. After that, a step of mixing a catalyst and a ligand with a solvent may be additionally conducted.

The fluorine-based polymer is a part becoming a main chain of the grafted polymer, and specific examples thereof are the same as described above. As one embodiment of the present invention, poly(vinylidene-co-chlorotrifluoroethylene) (hereinafter, P(VDF-co-CTFE)) may be comprised. In addition, the monomer having alkylene oxide group and a crosslinkable functional group may be poly(ethylene glycol) methacrylate (hereinafter, PEGMA) or hydroxyethyl methacrylate (hereinafter, HEMA).

After dissolving the fluorine-based polymer in a polar solvent, the monomer having an alkylene oxide group and a crosslinkable functional group may be introduced to the solution in which the fluorine-based polymer is dissolved, and then mixed. As the solvent, various solvents known in the art may be used, and for example, N-methyl-2-pyrrolidone (NMP), gamma-butyrolactone (GBL), dimethylformamide (DMF), dimethylacetamide (DMAc), tetrahydrofuran (THF) or the like may be used, however, the solvent is not limited thereto.

To the mixture solution, a catalyst and a ligand may be additionally mixed with a solvent.

Examples of the catalyst may comprise Cu(II)Cl$_2$, Cu(II)Br$_2$, Cu(II)I$_2$, Fe(II)Cl$_2$, Fe(III)Cl$_3$, mixtures thereof or the like, however, Cu(II)Cl$_2$, Cu(II)Br$_2$, Cu(II)I$_2$ or mixtures thereof may be preferably comprised as examples, and more preferably, Cu(II)Cl$_2$ may be used.

In addition, a content of the catalyst may be from 0.001 parts by weight to 1 part by weight, 0.005 parts by weight to 0.75 parts by weight, or 0.01 parts by weight to 0.5 parts by weight with respect to the whole 100 parts by weight of the composition. When the catalyst content is less than 0.001 parts by weight, the reaction rate is very delayed, and the content being greater than 1 part by weight may cause a problem of the polymerized copolymer having an excessively low molecular weight, and therefore, the content is properly selected within the above-mentioned range. In addition, as the catalyst, various forms of catalysts known in the art may be used. For example, forms such as powders, wires or meshes may be included, however, the form is not limited thereto.

The ligand is not particularly limited as long as it may be used in a polymerization reaction by bonding to the catalyst.

As one example, ligands having one or more nitrogen, oxygen, phosphorous and sulfur atoms capable of coordinating to the catalyst through σ-bonds, ligands containing two or more carbon atoms capable of coordinating to the catalyst through π-bonds may be comprised as the ligand, however, the ligand is not limited thereto, and specifically, a tris(2-pyridylmethyl)amine (TPMA) ligand may be used.

The ligand content may be from 100 parts by weight to 2000 parts by weight, 150 parts by weight to 1000 parts by weight, or 200 parts by weight to 500 parts by weight with respect to 100 parts by weight of the catalyst. When the ligand content is less than 100 parts by weight, formation of a metal complex obtained from bonding with the catalyst is too small, and the reaction is either very slow or not progressed, and the ligand content being greater than 2000 parts by weight has a problem in that preparation costs increase, and color develops due to excessive ligand use.

When mixing the ATRP reaction catalyst, the ligand and a radical initiator and stirring the result at 50° C. to 70° C., the ATRP reaction occurs and the grafted polymer may be obtained. The polymer according to one embodiment of the present invention may be PVDF-co-(PCTFE-g-(PEGMA-co-HEMA)) as in the following Chemical Formula 2.

[Chemical Formula 2]

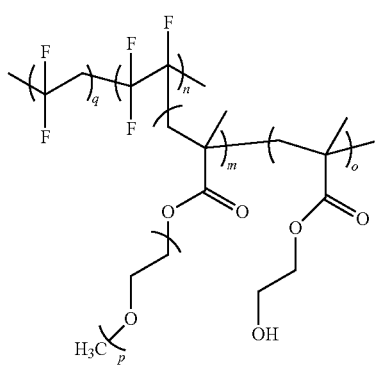

(In Chemical Formula 2, q, n, p, m and o are each independently an integer of 0≤q≤20,000, 1≤n≤22,000, 2≤p≤230, 1≤m≤200 and 2≤o≤50.)

After progressing the graft polymerization reaction, a step of removing unreacted monomers may be further conducted by placing the produced polymer in an ether solvent. After that, a step of drying the polymer under a vacuum condition is conducted to obtain a gel-type polymer electrolyte composition.

Method for Preparing Solid Electrolyte

The Method for Preparing Solid electrolyte according to the present invention may comprise a step of introducing the multifunctional crosslinking agent described above to the solid electrolyte composition in a molar ratio of 1:1 to 1:0.01 with respect to the crosslinking functional group present in the whole polymer, dissolving the result in a solvent, and then stirring the result for 1 hour to 6 hours. After that, the solution may be casted on a Teflon plate, and then the polymer may be crosslinked after going through a heat treatment process at 50° C. to 150° C., and prepared into a film form. The Teflon plate is dried for 3 days under a vacuum condition, and when the solid film is removed from the Teflon plate, a polymer solid electrolyte for a lithium secondary battery is formed.

Hereinafter, the present invention will be described in detail with reference to examples. However, examples according to the present invention may be modified to various different forms, and the scope of the present invention is not to be construed as being limited to the examples described below. The examples of the present invention are provided to those having average knowledge in the art in order to more fully describe the present invention.

Preparation Example 1 Preparation of PVDF-co-(PCTFE-g-(PEGMA-co-HEMA) Graft Copolymerized Using ATRP Method (A1)

In a 1000 ml flask, 10 g of P(VDF-co-CTFE) having a weight average molecular weight (hereinafter, Mw) of 600,000 as a fluorine-based polymer, and 116 g of PEGMA and 3.35 g of HEMA as monomers to polymerize were introduced to 450 ml of an acetone solvent, and the result was stirred for 1 hour under a nitrogen condition.

After that, 0.00266 g of $CuCl_2$ as an ATRP reaction catalyst, 0.0091 g of TPMA as a ligand, and 0.245 g of Tin(II) 2-ethylhexanoate ($Sn(EH)_2$) as an initiator were introduced to the flask, and an ATRP reaction was progressed by stirring the result for 30 hours under a nitrogen condition.

After completing the reaction, the produced polymer was immersed in an ether solvent 3 times to remove monomers that did not participate in the reaction. The finally obtained polymer was dried for 1 week under a vacuum condition to obtain a gel-type PVDF-co-(PCTFE-g-(PEGMA-co-HEMA) polymer.

Preparation Example 2 Preparation of PVDF-co-(PCTFE-g-(PEGMA-co-HEMA) Graft Copolymerized Using ATRP Method (A2)

In a 1000 ml flask, 10 g of P(VDF-co-CTFE) having a weight average molecular weight (hereinafter, Mw) of 600,000 as a fluorine-based polymer, and 54 g of PEGMA and 1.5 g of HEMA as monomers to polymerize were introduced to 300 ml of an acetone solvent, and the result was stirred for 1 hour under a nitrogen condition.

After that, 0.002 g of $CuCl_2$ as an ATRP reaction catalyst, 0.0051 g of TPMA as a ligand, and 0.231 g of $Sn(EH)_2$ as an initiator were introduced to the flask, and an ATRP reaction was progressed by stirring the result for 30 hours under a nitrogen condition.

After completing the reaction, the produced polymer was immersed in an ether solvent 3 times to remove monomers that did not participate in the reaction. The finally obtained polymer was dried for 1 week under a vacuum condition to obtain a gel-type PVDF-co-(PCTFE-g-(PEGMA-co-HEMA) polymer.

Comparative Preparation Example 1 Preparation of Polymer Using P(VDF-co-CTFE) Alone (B1)

A P(VDF-co-CTFE) polymer having a weight average molecular weight (hereinafter, Mw) of 600,000 was prepared alone without graft copolymerizing PEGMA and HEMA, the monomers in Preparation Examples 1 and 2.

Comparative Preparation Example 2 Preparation of Polymer without Using P(VDF-co-CTFE) (B2)

A polymer having a weight average molecular weight (hereinafter, Mw) of 230,000 was prepared by, in Preparation Examples 1 and 2, polymerizing PEGMA and HEMA in a molar ratio of 9:1 without using P(VDF-co-CTFE) as a main chain.

Preparation Examples 1 and 2, and Comparative Preparation Examples 1 and 2 are shown in the following Table 1.

Experimental Example—Measurements of Glass Transition Temperature and $H_{Tm}$

Measurement Device: DSC discovery 250 (TA instruments)

Measurement Condition: 20° C. to 100° C. (1st cycle), −90° C. to 200° C. (2nd cycle), 10° C./min, $N_2$ atm 10 mg of each of the polymers prepared in Preparation Examples 1 and 2, and Comparative Preparation Examples 1 and 2 was taken and placed in the DSC sample pan, and injected into the cell of the device. After measuring under the above-described temperature condition, an inflection point of a part where the slope changes were taken from the graph of temperature and heat capacity, and this was measured as a glass transition temperature ($T_g$). In the graph of temperature and heat capacity, another endothermic peak appeared after the glass transition temperature, and this point was Tm (melting point) and the width of the peak at which the Tm appeared was measured as $H_{Tm}$. Having a large $H_{Tm}$ means requiring large energy for crystals to melt, and having a larger $H_{Tm}$ means the polymer having higher crystallinity.

TABLE 1

| Polymer | P(VDF-co-CTFE): PEGMA: HEMA (Molar Ratio) | Content of Fluorine-Based polymer in Polymer | Mw (PDI) | Glass Transition Temperature (Tg, ° C.) | $H_{Tm}$ (J/g) |
|---|---|---|---|---|---|
| A1 | 1:13.5:1.5 | 10% | 1,800,000 (6.7) | −64 | 0.58 |
| A2 | 1:6.3:0.7 | 25% | 1,010,000 | −58 | 4.28 |

TABLE 1-continued

| Polymer | P(VDF-co-CTFE): PEGMA: HEMA (Molar Ratio) | Content of Fluorine-Based polymer in Polymer | Mw (PDI) | Glass Transition Temperature (Tg, °C.) | $H_{Tm}$ (J/g) |
|---|---|---|---|---|---|
| B1 | 1:0:0 | 100% | 0 (5.7) 600,000 (—) | −25 | 16.18 |
| B2 | 0:9:1 | 0% | 230,000 (3.2) | −73 | — |

(PDI: polydispersity index)

Example—Preparation of Solid Electrolyte

A solution obtained by dissolving 5 g of the polymer PVDF-co-(PCTFE-g-(PELMA-co-HEMA)) prepared in each of Preparation Examples 1 and 2, trifunctional toluene diisocyanate as a multifunctional crosslinking agent and LiTFSI as a lithium salt while varying a content thereof as in the following Table 2 in 50 ml of a tetrahydrofuran (hereinafter, THF) solvent was stirred for 6 hours to prepare a homogeneous solution. The solution was casted on a Teflon plate with a size of 2 cm×2 cm, and the result was dried for 6 hours at room temperature in a dry room, and then heated for 1 hour at a temperature of 120° C. to progress a thermal curing reaction. After that, the solid film was removed from the Teflon plate using a knife to obtain a solid electrolyte for a secondary battery.

Comparative Example—Preparation of Solid Electrolyte

A solution obtained by dissolving 5 g of the polymer prepared in each of Comparative Preparation Examples 1 and 2, trifunctional toluene diisocyanate as a multifunctional crosslinking agent and LiTFSI as a lithium salt while varying a content thereof as in the following Table 2 in 50 ml of a THF solvent was stirred for 6 hours to prepare a homogeneous solution. The solution was casted on a Teflon plate with a size of 2 cm×2 cm, and the result was dried for 6 hours at room temperature in a dry room, and then heated for 1 hour at a temperature of 120° C. to progress a thermal curing reaction. After that, the solid film was removed from the Teflon plate using a knife to obtain a solid electrolyte for a secondary battery.

Examples 1 to 5 and Comparative Examples 1 to 6 are shown in the following Table 2.

TABLE 2

| | Polymer | Content of LiTFSI (wt %) | Content of Multifunctional Crosslinking Agent[A] |
|---|---|---|---|
| Example 1 | A1 | 20 | 1:0.5 |
| Example 2 | A1 | 30 | 1:0.5 |
| Example 3 | A1 | 40 | 1:0.5 |
| Example 4 | A1 | 50 | 1:0.5 |
| Example 5 | A2 | 40 | 1:0.5 |
| Comparative Example 1 | B1 | 30 | — |
| Comparative Example 2 | B1 | 40 | — |
| Comparative Example 3 | B2 | 30 | 1:0.5 |
| Comparative Example 4 | B2 | 20 | 1:1 |
| Comparative Example 5 | B2 | 30 | 1:1 |
| Comparative Example 6 | B2 | 40 | 1:1 |

(A: crosslinkable functional group in polymer:crosslinkable functional group in multifunctional crosslinking agent (molar ratio))

Experimental Example—Measurement on Ion Conductivity of Electrolyte

Ion conductivity of the solid electrolyte prepared in each of Examples 1 to 5 and Comparative Examples 1 to 6 was obtained using the following Mathematical Formula 1 after measuring the impedance.

For the measurement, a film sample of the solid electrolyte having certain width and thickness was prepared. A SUS substrate having excellent electron conductivity was brought into contact with both surfaces of the plate-shaped sample as an ion blocking electrode, and then an alternating current voltage was applied through the electrodes on both surfaces of the sample. Herein, an amplitude range was set to a measurement frequency of 0.1 Hz to 10 MHz as the applied condition. Resistance of the bulk electrolyte was obtained from an intersection point ($R_b$) where a half-circle or a straight line of the measured impedance trajectory meets a real number axis, and ion conductivity of the polymer solid electrolyte membrane was calculated from the sample width and thickness. The results are shown in the following Table 3.

$$\sigma(S \cdot cm^{-1}) = \frac{1}{R_b}\frac{t}{A} \quad \text{[Mathematical Equation 1]}$$

σ: ion conductivity
$R_b$: intersection point between impedance trajectory and real number axis
A: sample width
t: sample thickness

TABLE 3

| | Film Formation | Ion Conductivity (S/cm) |
|---|---|---|
| Example 1 | O | 2.7 × 10⁻¹⁷ |
| Example 2 | O | 1.9 × 10⁻⁶ |
| Example 3 | O | 3.2 × 10⁻⁵ |
| Example 4 | O | 4.5 × 10⁻⁵ |
| Example 5 | O | 2.4 × 10⁻⁵ |
| Comparative Example 1 | O | 8.5 × 10⁻⁷ |
| Comparative Example 2 | O | 2.1 × 10⁻⁶ |
| Comparative Example 3 | X | 2.7 × 10⁻⁵ |
| Comparative Example 4 | O | 3.5 × 10⁻⁶ |
| Comparative Example 5 | O | 6.7 × 10⁻⁶ |
| Comparative Example 6 | O | 9.8 × 10⁻¹⁷ |

As shown in Table 3, ion conductivity of the solid electrolyte for a secondary battery comprising a polymer in which a monomer comprising alkylene oxide group and a crosslinkable functional group is grafted on a fluorine-based polymer was measured to be higher compared to the comparative examples with no grafting, and it was seen that ion conductivity was enhanced. In Comparative Example 3, it was seen that the electrolyte membrane according to the present invention was not formed although ion conductivity was high.

The invention claimed is:

1. A solid electrolyte composition for a secondary battery comprising:
   a fluorine-based polymer having grafted thereon a unit comprising alkylene oxide group and a crosslinkable functional group,
   wherein the fluorine-based polymer is present in an amount of 0.2 parts by weight to 40 parts by weight with respect to 100 parts by weight of the composition.

2. The solid electrolyte composition for a secondary battery of claim 1, wherein the fluorine-based polymer comprises a structure of the following Chemical Formula 1:

[Chemical Formula 1]

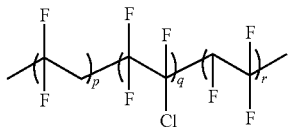

wherein p, q and r are each independently an integer of $0 \leq p \leq 20,000$, $1 \leq q \leq 22,000$ and $0 \leq r \leq 15,000$.

3. The solid electrolyte composition for a secondary battery of claim 1, wherein the grafted polymer comprises a structure of the following Chemical Formula 2:

[Chemical Formula 2]

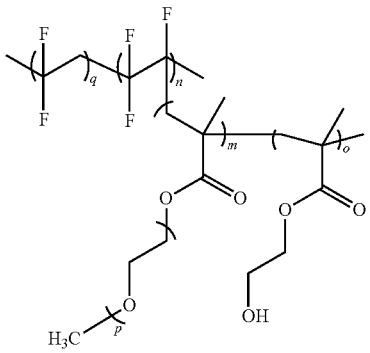

wherein q, n, p, m and o are each independently an integer of $0 \leq q \leq 20,000$, $1 \leq n \leq 22,000$, $2 \leq p \leq 230$, $1 \leq m \leq 200$ and $2 \leq o \leq 50$.

4. The solid electrolyte composition for a secondary battery of claim 1, wherein the alkylene oxide group is ethylene oxide or propylene oxide.

5. The solid electrolyte composition for a secondary battery of claim 1, wherein the crosslinkable functional group is one or more selected from the group consisting of a hydroxyl group, a carboxyl group and an isocyanate group.

6. The solid electrolyte composition for a secondary battery of claim 1, wherein the alkylene oxide group and the crosslinkable functional group have a molar ratio of 99.5:0.5 to 80:20.

7. The solid electrolyte composition for a secondary battery of claim 1, further comprising a multifunctional crosslinking agent having two or more functional groups capable of reacting with the crosslinkable functional group.

8. The solid electrolyte composition for a secondary battery of claim 7, wherein the multifunctional crosslinking agent is one or more selected from the group consisting of an isocyanate crosslinking agent, an epoxy crosslinking agent, an aziridine crosslinking agent and a metal chelate crosslinking agent.

9. The solid electrolyte composition for a secondary battery of claim 7, wherein the multifunctional crosslinking agent is comprised in 0.1 parts by weight to 6 parts by weight with respect to the whole 100 parts by weight of the electrolyte composition.

10. A solid electrolyte for a secondary battery formed by thermally curing the solid electrolyte composition for a secondary battery of claim 1.

11. The solid electrolyte for a secondary battery of claim 10, wherein the solid electrolyte has a thickness of 50 μm to 400 μm.

12. The solid electrolyte for a secondary battery of claim 10, further comprising a lithium salt in 30 parts by weight to 70 parts by weight with respect to 100 parts by weight of the electrolyte composition.

13. The solid electrolyte for a secondary battery of claim 12, wherein the lithium salt is one or more types selected from the group consisting of LiCl, LiBr, LiI, LiClO$_4$, LiBF$_4$, LiB$_{10}$Cl$_{10}$, LiPF$_6$, LiCF$_3$SO$_3$, LiTFSI, LiCF$_3$CO$_2$, LiAsF$_6$, LiSbF$_6$, LiAlCl$_4$, CH$_3$SO$_3$Li, (CF$_3$SO$_2$)$_2$NLi, LiN(SO$_2$F)$_2$, chloroborane lithium, lower aliphatic carboxylic acid lithium, lithium tetraphenylborate and lithium imide.

14. The solid electrolyte for a secondary battery of claim 10, which has ion conductivity of $1 \times 10^{-6}$ S/cm to $4 \times 10^{-5}$ S/cm.

15. A solid electrolyte composition for a secondary battery, comprising:
   a polymer, which is formed by a process comprising grafting a monomer on a fluorine-based polymer, wherein the monomer comprises alkylene oxide group and a crosslinkable functional group,
   wherein the polymer is present in an amount of 0.2 parts by weight to 40 parts by weight with respect to 100 parts by weight of the composition.

* * * * *